United States Patent
Shimozato

(10) Patent No.: US 8,406,969 B2
(45) Date of Patent: Mar. 26, 2013

(54) CONTROL APPARATUS AND CONTROL METHOD FOR CONTINUOUSLY VARIABLE TRANSMISSION

(75) Inventor: Yuya Shimozato, Miyoshi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 328 days.

(21) Appl. No.: 12/863,505

(22) PCT Filed: Jan. 7, 2009

(86) PCT No.: PCT/JP2009/050071
§ 371 (c)(1),
(2), (4) Date: Jul. 19, 2010

(87) PCT Pub. No.: WO2009/093481
PCT Pub. Date: Jul. 30, 2009

(65) Prior Publication Data
US 2010/0292900 A1 Nov. 18, 2010

(30) Foreign Application Priority Data
Jan. 22, 2008 (JP) ................................. 2008-011605

(51) Int. Cl.
*G06F 7/00* (2006.01)
(52) U.S. Cl. .......................................... 701/53; 477/34
(58) Field of Classification Search .................... 701/53, 701/51; 477/34
See application file for complete search history.

(56) References Cited

U.S. PATENT DOCUMENTS

| | | | | |
|---|---|---|---|---|
| 5,178,044 A | * | 1/1993 | Suzuki et al. | 477/43 |
| 6,226,583 B1 | * | 5/2001 | Iwata | 701/51 |
| 6,377,883 B1 | * | 4/2002 | Shimabukuro et al. | 701/51 |
| 6,427,109 B1 | * | 7/2002 | Doering et al. | 701/54 |
| 6,466,853 B1 | * | 10/2002 | Niimi et al. | 701/65 |

(Continued)

FOREIGN PATENT DOCUMENTS

| | | |
|---|---|---|
| JP | A-2004-028159 | 1/2004 |
| JP | A-2004-360874 | 12/2004 |
| JP | A-2007-177832 | 7/2007 |

OTHER PUBLICATIONS

International Search Report in International Application No. PCT/JP2009/050071; dated Mar. 24, 2009 (with English-language translation).

(Continued)

*Primary Examiner* — Thomas Black
*Assistant Examiner* — Shardul Patel
(74) *Attorney, Agent, or Firm* — Oliff & Berridge, PLC

(57) ABSTRACT

In order to suppress the clutch applying shocks at a garage shift time of a continuously variable transmission equipped with a hydraulic type forward-backward switching device, an ECU starts a timer of a predetermined time period, when the engine starts. If the garage shift occurs before a timer-up, the ECU starts a standby oil pressure control to feed the forward-backward switching device with a standby oil pressure lowered to such a level as to leave the forward-backward switching device unapplied. The ECU calculates a first fill hydraulic value in accordance with the time period from the engine start to the garage shift operation. After the time up, the ECU ends the standby oil pressure control, and executes a first fill control at the first fill hydraulic value calculated.

4 Claims, 8 Drawing Sheets

U.S. PATENT DOCUMENTS 8,027,771 B2* 9/2011 Martini et al. .................. 701/51
2005/0209760 A1* 9/2005 Tabata et al. .................... 701/53

OTHER PUBLICATIONS

Japanese Office Action in Japanese Patent Application No. 2008-011605; dated Feb. 17, 2009 (with English—language translation).

Decision to Grant Patent in Japanese Patent Application No. 2008-011605; dated Jul. 28, 2009 (with English—language translation).
Written Opinion of the International Searching Authority in International Application No. PCT/JP2009/050071; dated Mar. 24, 2009 (with English—language translation).

* cited by examiner

CONTROL APPARATUS AND CONTROL METHOD FOR CONTINUOUSLY VARIABLE TRANSMISSION

TECHNICAL FIELD

The present invention relates to a control apparatus for a continuously variable transmission, and in particular, to control over a continuously variable transmission including a hydraulic clutch engaged at the time of the garage shifting operation performed by an occupant.

BACKGROUND ART

A continuously variable transmission (CVT) such as a belt-type continuously variable transmission has been conventionally known, which achieves stepless gear shifting by coupling a primary pulley and a secondary pulley with a metallic belt and changing the width of these pulleys. A vehicle having this belt-type continuously variable transmission mounted thereon includes a vehicle that is forward driven only when a forward clutch provided between the continuously variable transmission and an engine is engaged and is reverse driven only when a reverse brake is engaged. When a shift lever is in a non-drive position (e.g., "N" position), the hydraulic pressure is drained to release the forward clutch and the reverse brake. When the shift lever is operated from the non-drive position to a drive position (e.g., "D" position or "R" position) (hereinafter also referred to as garage shifting), the hydraulic pressure is supplied to the forward clutch to engage the forward clutch or the hydraulic pressure is supplied to the reverse brake to engage the reverse brake. Japanese Patent Laying-Open No. 2007-177832 (Patent Document 1), for example, discloses a technique of suppressing belt slip when such garage shifting is done.

A control apparatus disclosed in Japanese Patent Laying-Open No. 2007-177832 controls a vehicle having a belt-type continuously variable transmission placed at a power transmission path between a power source for running and a driving wheel. This vehicle includes: a hydraulic engaging device capable of switching between a power transmission possible state and a power transmission interrupted state of the power transmission path between the power source for running and the continuously variable transmission; a switching valve for switching, based on a signal hydraulic pressure from a second electromagnetic valve, an oil passage for supplying a hydraulic pressure to the hydraulic engaging device to either a first oil passage for supplying a first hydraulic pressure regulated by a first electromagnetic valve in accordance with a predetermined rule to control a transient engaged state of the hydraulic engaging device or a second oil passage for supplying a second hydraulic pressure to bring the hydraulic engaging device into a completely engaged state; and a gear ratio control valve for controlling, based on the signal hydraulic pressure from the second electromagnetic valve, a hydraulic pressure to an actuator for changing a gear ratio of the continuously variable transmission. At the time of the garage shifting in which the shifting operation from the non-drive position to the drive position is performed, this control apparatus outputs, from the second electromagnetic valve, the signal hydraulic pressure for switching the switching valve to the first oil passage, and supplies the hydraulic pressure to the actuator via the gear ratio control valve such that the continuously variable transmission has a prescribed gear ratio regardless of the signal hydraulic pressure for switching the switching valve to the first oil passage. When the hydraulic pressure of the actuator is not enough at the time of the garage shifting in a state where a belt of the continuously variable transmission is not back to a maximum deceleration position at which the gear ratio is maximized, this control apparatus controls the first electromagnetic valve to temporarily decrease the first hydraulic pressure to be lower than a hydraulic pressure set in accordance with the predetermined rule.

According to the control apparatus disclosed in Japanese Patent Laying-Open No. 2007-177832, when the hydraulic pressure of the actuator for changing the gear ratio is not enough at the time of the garage shifting in the state where the belt of the belt-type continuously variable transmission is not back to the maximum deceleration position at which the gear ratio is maximized, the first electromagnetic valve is controlled to temporarily decrease the first hydraulic pressure, which is supplied to the hydraulic engaging device in order to switch the power transmission path between the power source for running and the continuously variable transmission to the power transmission possible state, to be lower than the hydraulic pressure set in accordance with the predetermined rule. Therefore, output torque of the power source for running input to the continuously variable transmission is decreased, and thus, the belt slip when the garage shifting is done in the state where the belt is not back to the maximum deceleration position is suppressed.

Patent Document 1: Japanese Patent Laying-Open No. 2007-177832

DISCLOSURE OF THE INVENTION

Problems to be Solved by the Invention

When the garage shifting is done and the hydraulic pressure is increased to switch the hydraulic engaging device from the power transmission interrupted state to the power transmission possible state, control (hereinafter also referred to as fast fill control) for sharply increasing the hydraulic pressure temporarily at an initial stage may be exercised to improve the control response of the hydraulic engaging device, and then, the hydraulic pressure may be reduced again and the reduced hydraulic pressure may be gradually increased to engage the hydraulic engaging device gradually. In the control apparatus disclosed in Patent Document 1, however, due to supply of the temporarily reduced hydraulic pressure, the control response of the hydraulic engaging device has already been improved to some extent before the fast fill control is exercised, and thus, if the fast fill control similar to the normal fast fill control (exercised when the hydraulic pressure is not temporarily reduced) is exercised, the hydraulic engaging device is engaged abruptly during the fast fill control and a shock may occur.

The present invention has been made to solve the above problems, and an object thereof is to provide, in a continuously variable transmission including a hydraulic clutch by which driving power between a power source and a driving wheel is switched to either a transmission state or a non-transmission state based on an occupant's operation, a control apparatus and a control method that allow suppression of an engagement shock of the clutch at the time of garage shifting.

Means for Solving the Problems

A control apparatus according to the present invention controls a continuously variable transmission including a hydraulic clutch by which driving power between a power source and a driving wheel is switched to either a transmission state or a non-transmission state based on an occupant's operation. The control apparatus includes: a reducing unit for temporarily reducing a hydraulic pressure supplied to the clutch such that the clutch waits in the non-transmission state, when an occupant performs an operation of switching the clutch from the non-transmission state to the transmission state before a predetermined time period has elapsed since the power source started up; and a control unit for, when the hydraulic pressure supplied to the clutch is increased after temporary reduction by the reducing unit, controlling at least any one of an amount of increase in the hydraulic pressure supplied to the clutch and a time period for which the hydraulic pressure supplied to the clutch is increased, based on a state related to a control response of the clutch at an end of the temporary reduction.

According to the present invention, in a belt-type continuously variable transmission, for example, shortage of the belt clamping force may occur, which may lead to belt slip, at an initial stage of startup of the power source. Thus, when the occupant performs the operation of switching the clutch from the non-transmission state to the transmission state (garage shifting) before the predetermined time period has elapsed since the power source started up, the hydraulic pressure supplied to the clutch is temporarily reduced such that the clutch waits in the non-transmission state. As a result, the belt slip due to the garage shifting is prevented. When the hydraulic pressure temporarily reduced as described above is increased after the predetermined time period has elapsed, the clutch is abruptly engaged and a shock may occur immediately after the hydraulic pressure is increased. This is because the control response of the clutch has already been improved to some extent due to supply of the reduced hydraulic pressure. Thus, when the hydraulic pressure supplied to the clutch is increased after temporary reduction, at least any one of the amount of increase in the hydraulic pressure supplied to the clutch and the time period for which the hydraulic pressure supplied to the clutch is increased is controlled based on the state related to the control response of the clutch at the end of the temporary reduction. With such a configuration, when the control response of the clutch at the end of the temporary reduction is high, for example, abrupt engagement of the clutch immediately after the hydraulic pressure is increased can be suppressed by decreasing the amount of increase in the supplied hydraulic pressure or shortening the time period for which the supplied hydraulic pressure is increased. Therefore, the engagement shock of the clutch at the time of the garage shifting can be suppressed. As a result, there can be provided, in the continuously variable transmission including the hydraulic clutch by which the driving power between the power source and the driving wheel is switched to either the transmission state or the non-transmission state based on the occupant's operation, the control apparatus that allows suppression of the engagement shock of the clutch at the time of the garage shifting.

Preferably, the control unit decreases at least any one of the amount of increase in the hydraulic pressure supplied to the clutch and the time period for which the hydraulic pressure supplied to the clutch is increased, more greatly when the control response of the clutch is high than when the control response of the clutch is low.

According to the present invention, at least any one of the amount of increase in the hydraulic pressure and the time period for which the hydraulic pressure is increased is decreased more greatly when the control response of the clutch at the end of the temporary reduction of the hydraulic pressure is high than when the control response of the clutch at the end of the temporary reduction of the hydraulic pressure is low. Therefore, abrupt engagement of the clutch immediately after the hydraulic pressure is increased can be suppressed.

More preferably, the control unit determines that the control response of the clutch is high and decreases at least any one of the amount of increase in the hydraulic pressure supplied to the clutch and the time period for which the hydraulic pressure supplied to the clutch is increased, more greatly when a duration of the temporary reduction of the hydraulic pressure is long than when the duration of the temporary reduction of the hydraulic pressure is short.

According to the present invention, the control response of the clutch at the end of the temporary reduction of the hydraulic pressure is determined based on the duration of the temporary reduction of the hydraulic pressure, and at least any one of the amount of increase in the hydraulic pressure supplied to the clutch and the time period for which the hydraulic pressure supplied to the clutch is increased can be decreased.

More preferably, the reducing unit temporarily reduces the hydraulic pressure supplied to the clutch, for a time period from a first timing when the operation of switching the clutch to the transmission state is performed to a second timing when the predetermined time period has elapsed since the power source started up. The control unit detects a time period from startup of the power source to the first timing, and when the hydraulic pressure supplied to the clutch is increased after the second timing, the control unit decreases at least any one of the amount of increase in the hydraulic pressure supplied to the clutch and the time period for which the hydraulic pressure supplied to the clutch is increased, more greatly when the time period from startup of the power source to the first timing is short than when the time period from startup of the power source to the first timing is long.

According to the present invention, the hydraulic pressure supplied to the clutch is temporarily reduced for the time period from the first timing when the operation of switching the clutch to the transmission state (garage shifting) is performed to the second timing when the predetermined time period has elapsed since the power source started up. Thus, the time period from startup of the power source to the first timing is detected, and at least any one of the amount of increase in the hydraulic pressure supplied to the clutch and the time period for which the hydraulic pressure supplied to the clutch is increased is decreased more greatly when the detected time period is short than when the detected time period is long. As a result, at least any one of the amount of increase in the hydraulic pressure supplied to the clutch and the time period for which the hydraulic pressure supplied to the clutch is increased can be decreased more greatly when the duration of the temporary reduction of the hydraulic pressure is long than when the duration of the temporary reduction of the hydraulic pressure is short.

More preferably, the continuously variable transmission is a belt-type continuously variable transmission. According to the present invention, the belt slip of the belt-type continuously variable transmission at the time of the garage shifting can be prevented.

Figure 1:
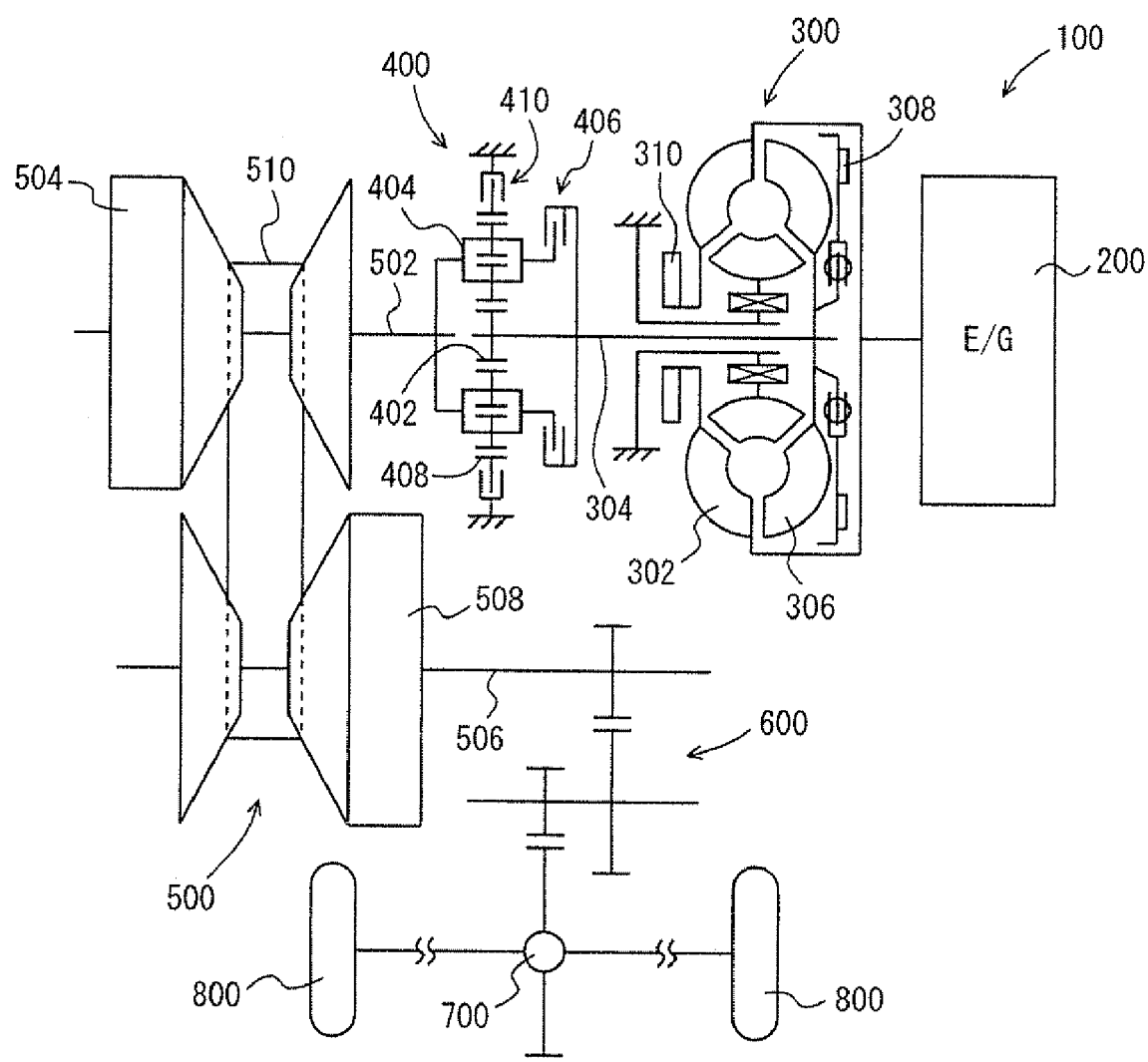
FIG. 1 is a skeleton diagram of a vehicle on which a control apparatus according to an embodiment of the present invention is mounted.

DESCRIPTION OF THE REFERENCE SIGNS 100 drive device; 200 engine; 300 torque converter; 302 pump impeller; 304 turbine shaft; 306 turbine runner; 308 lockup clutch; 310 oil pump; 400 forward/reverse driving switching device; 402 sun gear; 404 carrier; 406 forward clutch; 408 ring gear; 410 reverse brake; 500 belt-type continuously variable transmission; 502 input shaft; 504 primary pulley; 506 output shaft; 508 secondary pulley; 510 power transmission belt; 600 deceleration gear; 700 differential gear mechanism; 800 driving wheel; 900 ECU; 902 engine rotation speed sensor; 904 turbine rotation speed sensor; 906 vehicle speed sensor; 908 throttle opening degree sensor; 910 cooling water temperature sensor; 912 oil temperature sensor; 914 accelerator opening degree sensor; 916 foot brake switch; 918 position sensor; 920 shift lever; 922 primary pulley rotation speed sensor; 924 secondary pulley rotation speed sensor; 926 ignition switch; 930 timer unit; 932 wait control unit; 934 garage shifting operation time detecting unit; 936 fast fill hydraulic pressure value calculating unit; 938 fast fill control unit; 940 hydraulic pressure command unit; 1000 electronic throttle valve; 1100 fuel injector; 1200 igniter; 2000 hydraulic pressure control circuit; 2002 line pressure oil passage; 2100 primary regulator valve; 2200 SLT linear solenoid valve; 2210 SLS linear solenoid valve; 2310 modulator valve (1); 2330 modulator valve (3); 2340 modulator valve (4); 2312 pressure sensor; 2400 control valve; 2510 duty solenoid (1) for gear shifting control; 2520 duty solenoid (2) for gear shifting control; 2600 manual valve; 2710 ratio control valve (1); 2720 ratio control valve (2)

BEST MODES FOR CARRYING OUT THE INVENTION

Embodiments of the present invention will be described with reference to the drawings hereinafter. In the following description, the same components are denoted with the same reference characters. Their names and functions are also the same. Accordingly, detailed description on them will not be repeated.

A vehicle on which a control apparatus according to the present embodiment is mounted will be described with reference to FIG. 1. An output of an engine 200 of a drive device 100 mounted on this vehicle is input to a belt-type continuously variable transmission 500 via a torque converter 300 and a forward/reverse driving switching device 400. An output of belt-type continuously variable transmission 500 is transmitted to a deceleration gear 600 and a differential gear mechanism 700, and is divided into right and left driving wheels 800. Drive device 100 is controlled by an ECU (Electronic Control Unit) 900 that will be described later. It is noted that a toroidal-type continuously variable transmission may be used instead of belt-type continuously variable transmission 500.

Torque converter 300 is configured by a pump impeller 302 coupled to a crankshaft of engine 200 and a turbine runner 306 coupled to forward/reverse driving switching device 400 by a turbine shaft 304. A lockup clutch 308 is provided between pump impeller 302 and turbine runner 306. Lockup clutch 308 is engaged or released by switching hydraulic pressure supply to an oil chamber on the engagement side and an oil chamber on the release side.

When lockup clutch 308 is completely engaged, pump impeller 302 and turbine runner 306 are integrally rotated. Pump impeller 302 is provided with a mechanical oil pump 310 that generates the hydraulic pressure for controlling gear shifting of belt-type continuously variable transmission 500, generating the belt clamping force, or supplying the lubricating oil to each portion.

Forward/reverse driving switching device 400 is configured by a double-pinion-type planetary gear mechanism. Turbine shaft 304 of torque converter 300 is coupled to a sun gear 402. An input shaft 502 of belt-type continuously variable transmission 500 is coupled to a carrier 404. Carrier 404 and sun gear 402 are coupled by a forward clutch (C1 clutch) 406. A ring gear 408 is fixed to a housing by a reverse brake (B1 brake) 410. Forward clutch 406 and reverse brake 410 are frictionally engaged by a hydraulic cylinder. The input rotation speed of forward clutch 406 is the same as the rotation speed of turbine shaft 304, that is, a turbine rotation speed NT.

When forward clutch 406 is engaged and reverse brake 410 is released, forward/reverse driving switching device 400 attains an engaged state for forward driving. In this state, the driving force in the forward driving direction is transmitted to belt-type continuously variable transmission 500. When reverse brake 410 is engaged and forward clutch 406 is released, forward/reverse driving switching device 400 attains an engaged state for reverse driving. In this state, input shaft 502 is rotated in a direction opposite to that of turbine shaft 304. As a result, the driving force in the reverse driving direction is transmitted to belt-type continuously variable transmission 500. When forward clutch 406 and reverse brake 410 are both released, forward/reverse driving switching device 400 attains a neutral state where power transmission is interrupted.

Belt-type continuously variable transmission 500 is configured by a primary pulley 504 provided at input shaft 502, a secondary pulley 508 provided at an output shaft 506, and a power transmission belt 510 wound around these pulleys. The friction force between each pulley and power transmission belt 510 is used for power transmission.

Each pulley is configured by a hydraulic cylinder such that the groove width is variable. By controlling the hydraulic pressure of the hydraulic cylinder of primary pulley 504, the groove width of each pulley is changed. As a result, the winding diameter of power transmission belt 510 is changed and a gear ratio GR (=primary pulley rotation speed NIN/secondary pulley rotation speed NOUT) is continuously changed. By controlling the hydraulic pressure of the hydraulic cylinder of secondary pulley 508, the belt clamping force is changed. The oil capacity of the hydraulic cylinder of secondary pulley 508 is larger than the oil capacity of forward clutch 406 and the oil capacity of reverse brake 410.

Figure 2:
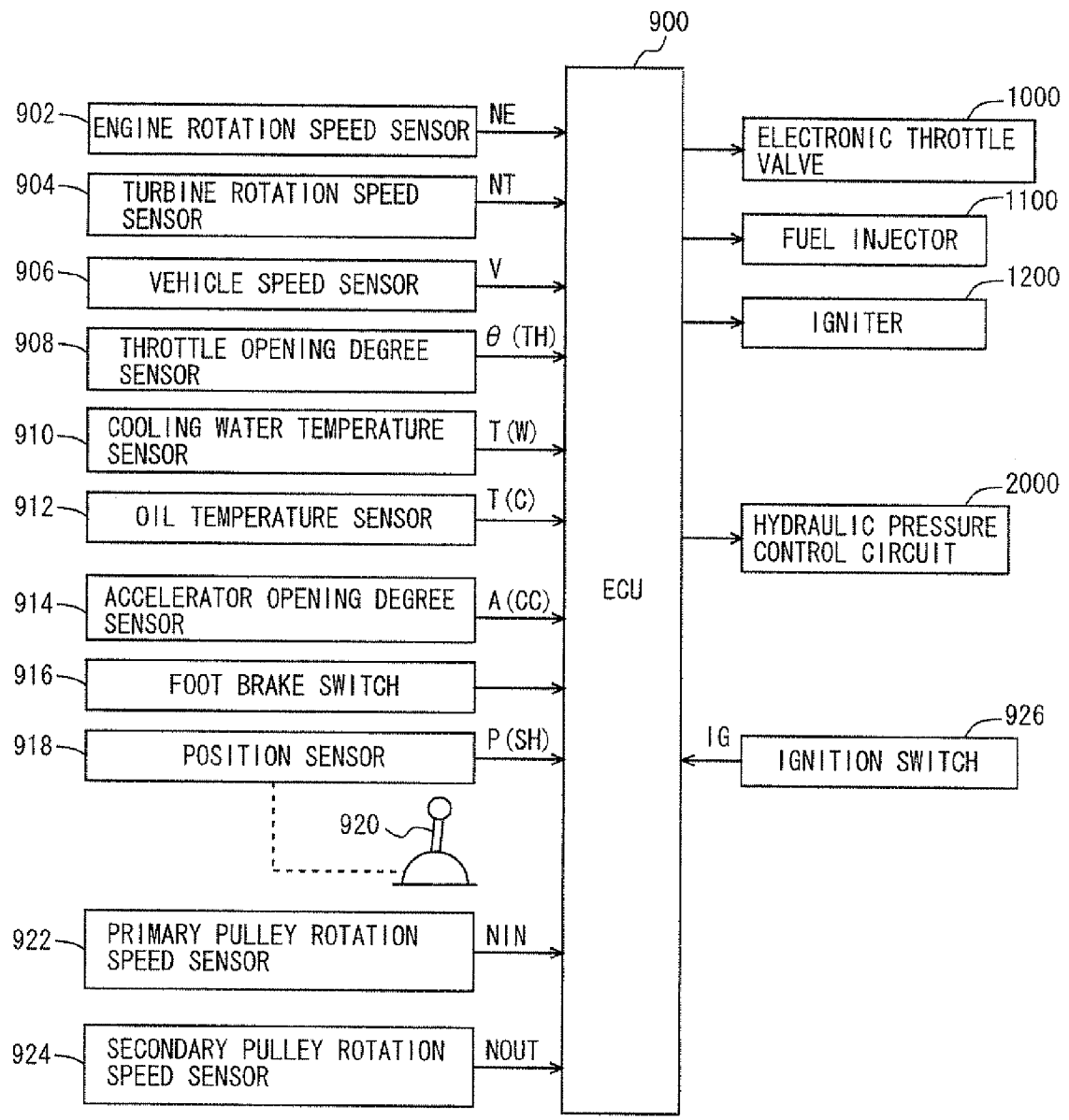
FIG. 2 is a control block diagram illustrating the control apparatus according to the embodiment of the present invention.

As shown in FIG. 2, an engine rotation speed sensor 902, a turbine rotation speed sensor 904, a vehicle speed sensor 906, a throttle opening degree sensor 908, a cooling water temperature sensor 910, an oil temperature sensor 912, an accelerator opening degree sensor 914, a foot brake switch 916, a position sensor 918, a primary pulley rotation speed sensor 922, a secondary pulley rotation speed sensor 924, and an ignition switch 926 are connected to ECU 900.

Engine rotation speed sensor 902 detects a rotation speed NE of engine 200 (engine rotation speed). Turbine rotation speed sensor 904 detects a rotation speed NT of turbine shaft 304 (turbine rotation speed). Vehicle speed sensor 906 detects a vehicle speed V. Throttle opening degree sensor 908 detects an opening degree θ (TH) of an electronic throttle valve. Cooling water temperature sensor 910 detects a cooling water temperature T (W) of engine 200. Oil temperature sensor 912 detects an oil temperature T (C) of belt-type continuously variable transmission 500 and the like. Accelerator opening degree sensor 914 detects an opening degree A (CC) of an accelerator pedal. Foot brake switch 916 detects the presence or absence of the operation of a foot brake. Position sensor 918 detects a position P (SH) of shift lever 920 by determining whether a contact point provided at a position corresponding to a shift position is ON or OFF. Primary pulley rotation speed sensor 922 detects a rotation speed NIN of primary pulley 504. Secondary pulley rotation speed sensor 924 detects a rotation speed NOUT of secondary pulley 508. Ignition switch 926 detects an ignition position (ON position or OFF position) operated by the driver. A signal indicating the result of detection by each sensor is sent to ECU 900. Turbine rotation speed NT matches primary pulley rotation speed NIN at the time of forward driving when forward clutch 406 is engaged. Vehicle speed V is set to a value corresponding to secondary pulley rotation speed NOUT. Accordingly, when the vehicle is in a stopped state and forward clutch 406 is in the engaged state, turbine rotation speed NT becomes zero.

ECU 900 includes a CPU (Central Processing Unit), a memory, an input/output interface, and the like. The CPU performs signal processing in accordance with a program stored in the memory. As a result, control over output of engine 200, control over gear shifting of belt-type continuously variable transmission 500, control over the belt clamping force, control over engagement/release of forward clutch 406, control over engagement/release of reverse brake 410, and the like are exercised.

The control over output of engine 200 is exercised by an electronic throttle valve 1000, a fuel injector 1100, an igniter 1200, and the like. The control over gear shifting of belt-type continuously variable transmission 500, the control over the belt clamping force, the control over engagement/release of forward clutch 406, and the control over engagement/release of reverse brake 410 are exercised by a hydraulic pressure control circuit 2000.

A part of hydraulic pressure control circuit 2000 will be described with reference to FIG. 3. It is noted that hydraulic pressure control circuit 2000 that will be described hereinafter is by way of example and the control circuit is not limited thereto.

The hydraulic pressure generated by oil pump 310 is supplied via a line pressure oil passage 2002 to a primary regulator valve 2100, a modulator valve (1) 2310 and a modulator valve (3) 2330.

Primary regulator valve 2100 is selectively supplied with the control pressure from any one of an SLT linear solenoid valve 2200 and an SLS linear solenoid valve 2210. In the present embodiment, SLT linear solenoid valve 2200 and SLS linear solenoid valve 2210 are both normally open solenoid valves (the hydraulic pressure output during non-energization is maximized). It is noted that SLT linear solenoid valve 2200 and SLS linear solenoid valve 2210 may be normally closed solenoid valves (the hydraulic pressure output during non-energization is minimized ("zero")).

A spool of primary regulator valve 2100 slides up and down in accordance with the supplied control pressure. As a result, the hydraulic pressure generated at oil pump 310 is regulated (adjusted) by primary regulator valve 2100. The hydraulic pressure regulated by primary regulator valve 2100 is used as a line pressure PL.

The hydraulic pressure regulated by modulator valve (3) 2330, taking line pressure PL as the base pressure, is supplied to SLT linear solenoid valve 2200 and SLS linear solenoid valve 2210.

SLT linear solenoid valve 2200 and SLS linear solenoid valve 2210 generate the control pressure in accordance with a current value determined by a command signal sent from ECU 900.

Of the control pressure (output hydraulic pressure) of SLT linear solenoid valve 2200 and the control pressure (output hydraulic pressure) of SLS linear solenoid valve 2210, the control pressure supplied to primary regulator valve 2100 is selected by a control valve 2400.

Figure 3:
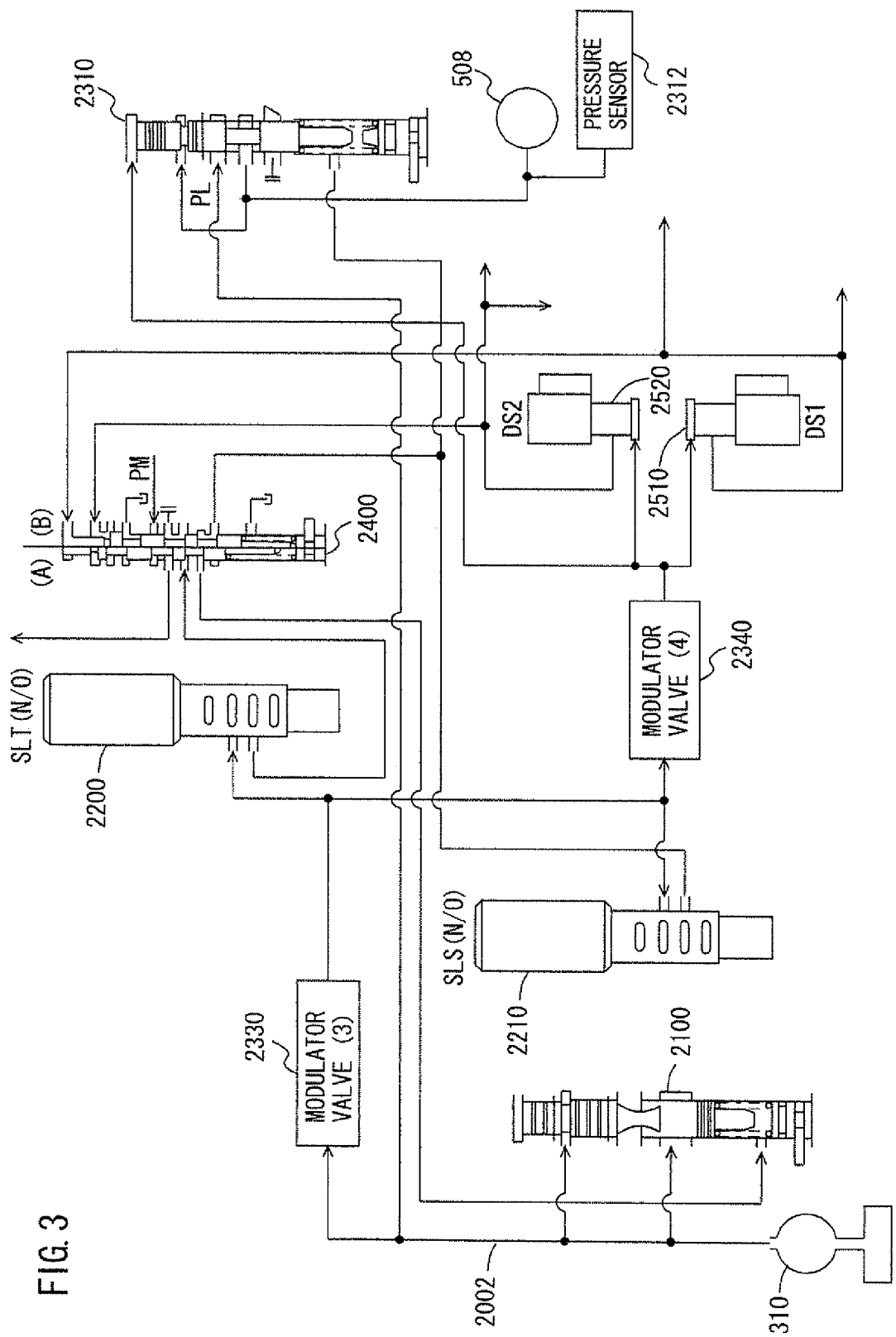
FIG. 3 is a diagram (No. 1) illustrating a hydraulic pressure control circuit controlled by the control apparatus according to the embodiment of the present invention.

When a spool of control valve 2400 is in the (A) state (the state on the left side) in FIG. 3, the control pressure is supplied from SLT linear solenoid valve 2200 to primary regulator valve 2100. In other words, line pressure PL is controlled in accordance with the control pressure of SLT linear solenoid valve 2200.

When the spool of control valve 2400 is in the (B) state (the state on the right side) in FIG. 3, the control pressure is supplied from SLS linear solenoid valve 2210 to primary regulator valve 2100. In other words, line pressure PL is controlled in accordance with the control pressure of SLS linear solenoid valve 2210.

It is noted that, when the spool of control valve 2400 is in the (B) state in FIG. 3, the control pressure of SLT linear solenoid valve 2200 is supplied to a manual valve 2600 that will be described later.

The spool of control valve 2400 is biased in one direction by a spring. The hydraulic pressure is supplied from a duty solenoid (1) 2510 for gear shifting control and a duty solenoid (2) 2520 for gear shifting control to oppose this bias force of the spring.

When the hydraulic pressure is supplied from both duty solenoid (1) 2510 for gear shifting control and duty solenoid (2) 2520 for gear shifting control to control valve 2400, the spool of control valve 2400 attains the (33) state in FIG. 3.

When the hydraulic pressure is not supplied from at least any one of duty solenoid (1) 2510 for gear shifting control and duty solenoid (2) 2520 for gear shifting control to control valve 2400, the spool of control valve 2400 attains the (A) state in FIG. 3 due to the bias force of the spring.

Duty solenoid (1) 2510 for gear shifting control and duty solenoid (2) 2520 for gear shifting control are supplied with the hydraulic pressure regulated by a modulator valve (4) 2340. Modulator valve (4) 2340 regulates the hydraulic pressure supplied from modulator valve (3) 2330 to a fixed pressure.

Modulator valve (1) 2310 outputs the hydraulic pressure regulated by taking line pressure PL as the base pressure. The hydraulic pressure output from modulator valve (1) 2310 is supplied to the hydraulic cylinder of secondary pulley 508. The hydraulic cylinder of secondary pulley 508 is supplied with the hydraulic pressure that does not cause slip of power transmission belt 510.

Modulator valve (1) 2310 is provided with a spool that can move axially and a spring that biases the spool in one direction. Modulator valve (1) 2310 regulates line pressure PL introduced into modulator valve (1) 2310, taking the output hydraulic pressure of SLS linear solenoid valve 2210 controlled by ECU 900 as the pilot pressure. The hydraulic pressure regulated by modulator valve (1) 2310 is supplied to the hydraulic cylinder of secondary pulley 508. The belt clamping force is increased or decreased in accordance with the output hydraulic pressure from modulator valve (1) 2310.

In accordance with a map in which accelerator opening degree A (CC) and gear ratio GR are parameters, SLS linear solenoid valve 2210 is controlled to achieve the belt clamping force that does not cause the belt slip. Specifically, an exciting current to SLS linear solenoid valve 2210 is controlled with a duty ratio corresponding to the belt clamping force. It is noted that, when transmission torque suddenly changes at the time of acceleration, deceleration and the like, the belt clamping force may be corrected to increase, thereby suppressing the belt slip.

The hydraulic pressure supplied to the hydraulic cylinder of secondary pulley 508 is detected by a pressure sensor 2312.

Manual valve 2600 will be described with reference to FIG. 4. Manual valve 2600 is mechanically switched in accordance with the operation of shift lever 920. As a result, forward clutch 406 and reverse brake 410 are engaged or released.

Shift lever 920 is operated to a "P" position for parking, an "R" position for reverse driving, an "N" position for interrupting power transmission, and a "D" position and a "B" position for forward driving.

In the "P" position and the "N" position, the hydraulic pressure within forward clutch 406 and reverse brake 410 is drained from manual valve 2600. As a result, forward clutch 406 and reverse brake 410 are released.

In the "R" position, the hydraulic pressure is supplied from manual valve 2600 to reverse brake 410. As a result, reverse brake 410 is engaged. On the other hand, the hydraulic pressure within forward clutch 406 is drained from manual valve 2600. As a result, forward clutch 406 is released.

Figure 4:
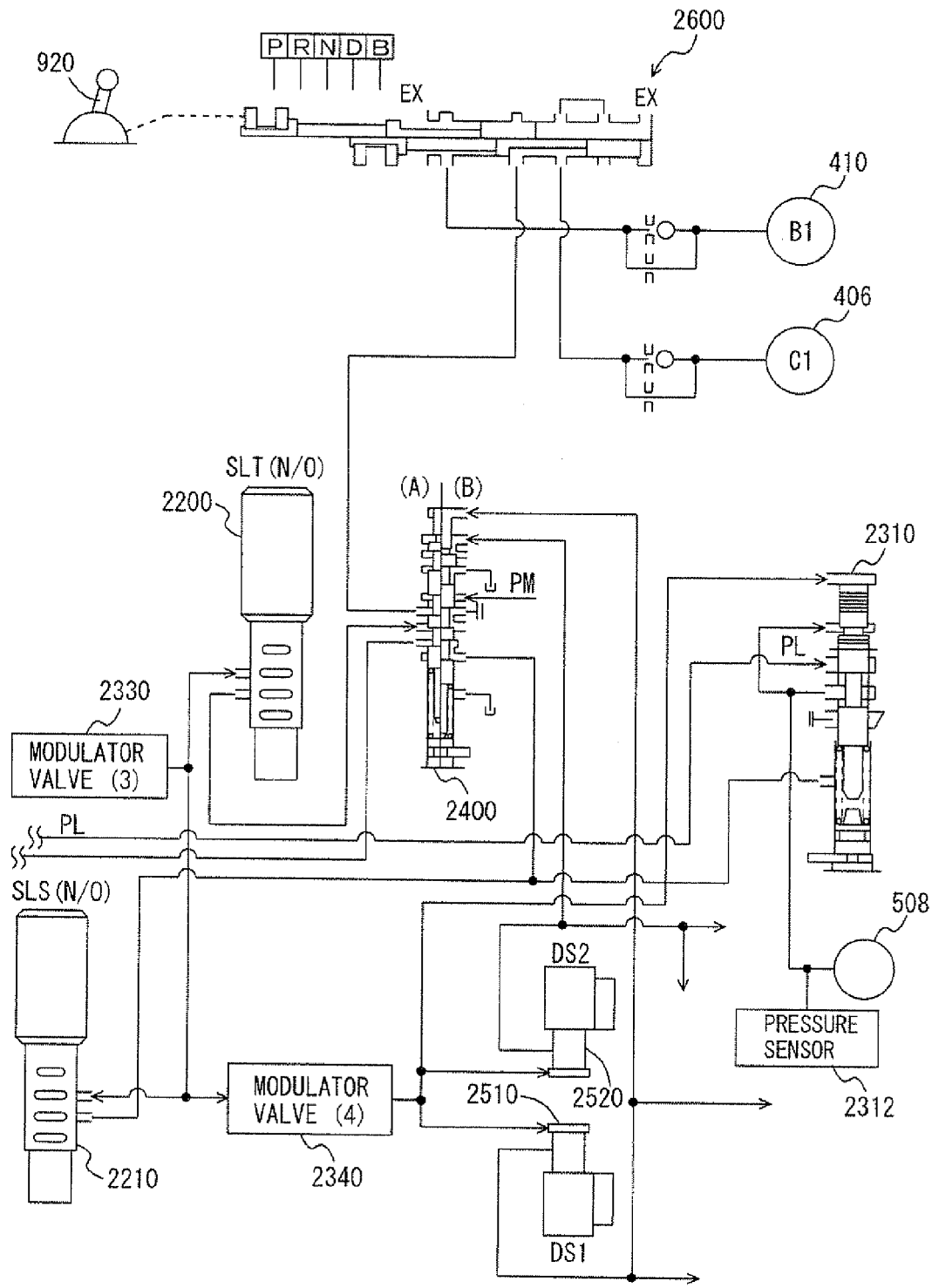
FIG. 4 is a diagram (No. 2) illustrating the hydraulic pressure control circuit controlled by the control apparatus according to the embodiment of the present invention.

When control valve 2400 is in the (A) state (the state on the left side) in FIG. 4, a modulator pressure PM supplied from a not-shown modulator valve (2) is supplied via control valve 2400 to manual valve 2600. This modulator pressure PM keeps reverse brake 410 in the engaged state.

When control valve 2400 is in the (B) state (the state on the right side) in FIG. 4, the hydraulic pressure regulated by SLT linear solenoid valve 2200 is supplied to manual valve 2600. By regulating the hydraulic pressure by SLT linear solenoid valve 2200, reverse brake 410 is gradually engaged and a shock at the time of engagement is suppressed.

In addition, if the amount of energization of SLT linear solenoid valve 2200 is maximized when control valve 2400 is in the (B) state (the state on the right side) in FIG. 4, output of the hydraulic pressure from SLT linear solenoid valve 2200 stops and the hydraulic pressure supplied to reverse brake 410 becomes "zero." In other words, the hydraulic pressure is drained from reverse brake 410 via SLT linear solenoid valve 2200 and reverse brake 410 is released.

In the "D" position and the "B" position, the hydraulic pressure is supplied from manual valve 2600 to forward clutch 406. As a result, forward clutch 406 is engaged. On the other hand, the hydraulic pressure within reverse brake 410 is drained from manual valve 2600. As a result, reverse brake 410 is released.

When control valve 2400 is in the (A) state (the state on the left side) in FIG. 4, modulator pressure PM supplied from the not-shown modulator valve (2) is supplied via control valve 2400 to manual valve 2600. This modulator pressure PM keeps forward clutch 406 in the engaged state.

When control valve 2400 is in the (B) state (the state on the right side) in FIG. 4, the hydraulic pressure regulated by SLT linear solenoid valve 2200 is supplied to manual valve 2600. By regulating the hydraulic pressure by SLT linear solenoid valve 2200, forward clutch 406 is gradually engaged and a shock at the time of engagement is suppressed.

SLT linear solenoid valve 2200 normally controls line pressure PL by means of control valve 2400. SLS linear solenoid valve 2210 normally controls the belt clamping force by means of modulator valve (1) 2310.

On the other hand, when a neutral control exercise condition is satisfied including a condition that the vehicle stops (the vehicle speed becomes "zero") in the state where shift lever 920 is in the "D" position, SLT linear solenoid valve 2200 controls the engagement force of forward clutch 406 to decrease the engagement force of forward clutch 406. SLS linear solenoid valve 2210 controls the belt clamping force by means of modulator valve (1) 2310, and controls line pressure PL instead of SLT linear solenoid valve 2200.

When the garage shifting (the operation of switching shift lever 920 from the "N" position to the "D" position or the "R" position) is done, SLT linear solenoid valve 2200 supplies, to forward clutch 406 or reverse brake 410, the hydraulic pressure corresponding to the command signal from ECU 900, and controls the engagement force of forward clutch 406 or reverse brake 410. Furthermore, when the garage shifting is done, SLS linear solenoid valve 2210 controls the belt clamping force by means of modulator valve (1) 2310, and controls line pressure PL instead of SLT linear solenoid valve 2200.

Although the case is described in the present embodiment, in which control over the hydraulic pressure of forward/reverse driving switching device 400 (forward clutch 406 or reverse brake 410) when the garage shifting is done is exercised at SLT linear solenoid valve 2200, hydraulic pressure control circuit 2000 according to the present embodiment is by way of example as described above, and the control over the hydraulic pressure of forward/reverse driving switching device 400 when the garage shifting is done may be exercised at SLS linear solenoid valve 2210, for example.

A configuration for gear shifting control will be described with reference to FIG. 5. The gear shifting control is exercised by controlling supply and discharge of the hydraulic pressure from/to the hydraulic cylinder of primary pulley 504. A ratio control valve (1) 2710 and a ratio control valve (2) 2720 are used to supply and discharge a hydraulic fluid from/to the hydraulic cylinder of primary pulley 504.

The hydraulic cylinder of primary pulley 504 communicates with ratio control valve (1) 2710 to which line pressure PL is supplied and ratio control valve (2) 2720 connected to a drain.

Ratio control valve (1) 2710 is for performing upshifting. Ratio control valve (1) 2710 is configured to open and close, by means of a spool, a flow path between an input port to which line pressure PL is supplied and an output port that communicates with the hydraulic cylinder of primary pulley 504.

A spring is arranged at one end of the spool of ratio control valve (1) 2710. A port to which the control pressure from duty solenoid (1) 2510 for gear shifting control is supplied is formed at an end opposite to the spring with the spool interposed therebetween. In addition, a port to which the control pressure from duty solenoid (2) 2520 for gear shifting control is supplied is formed at the end on the side where the spring is arranged.

Figure 5:
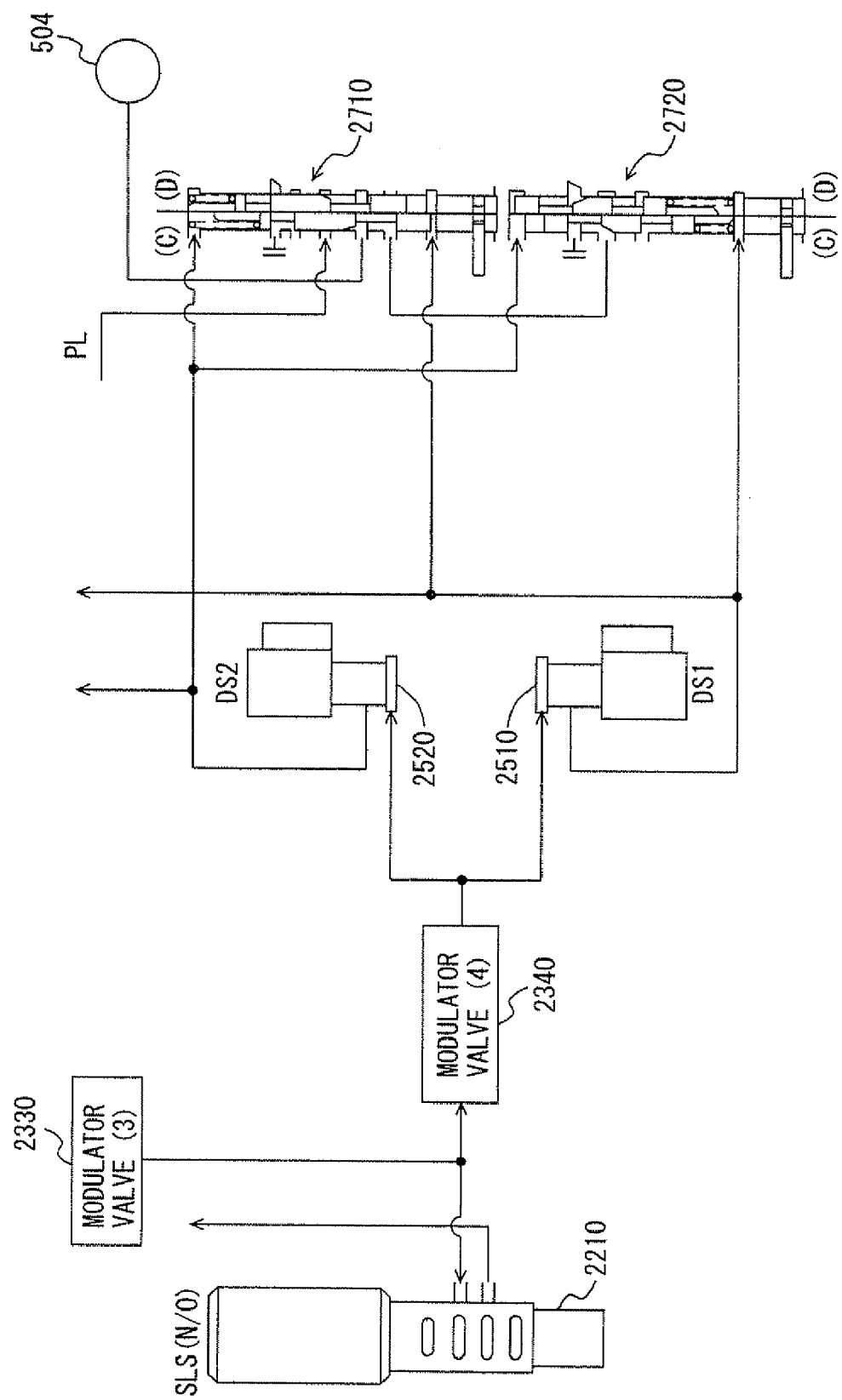
FIG. 5 is a diagram (No. 3) illustrating the hydraulic pressure control circuit controlled by the control apparatus according to the embodiment of the present invention.

By making higher the control pressure from duty solenoid (1) 2510 for gear shifting control and preventing duty solenoid (2) 2520 for gear shifting control from outputting the control pressure, the spool of ratio control valve (1) 2710 attains the (D) state (the state on the right side) in FIG. 5.

In this state, the hydraulic pressure supplied to the hydraulic cylinder of primary pulley 504 increases and the groove width of primary pulley 504 becomes narrow. Therefore, the gear ratio decreases. In other words, upshifting is performed. In addition, by increasing the amount of flow of the hydraulic fluid supplied at this time, the gear shifting speed increases.

Ratio control valve (2) 2720 is for performing downshifting. A spring is arranged at one end of the spool of ratio control valve (2) 2720. A port to which the control pressure from duty solenoid (1) 2510 for gear shifting control is supplied is formed at an end on the side where the spring is arranged. A port to which the control pressure from duty solenoid (2) 2520 for gear shifting control is supplied is formed at an end opposite to the spring with the spool interposed therebetween.

By making higher the control pressure from duty solenoid (2) 2520 for gear shifting control and preventing duty solenoid (1) 2510 for gear shifting control from outputting the control pressure, the spool of ratio control valve (2) 2720 attains the (C) state (the state on the left side) in FIG. 5. At the same time, the spool of ratio control valve (1) 2710 attains the (C) state (the state on the left side) in FIG. 5.

In this state, the hydraulic fluid is discharged from the hydraulic cylinder of primary pulley 504 via ratio control valve (1) 2710 and ratio control valve (2) 2720. Therefore, the groove width of primary pulley 504 becomes wide. As a result, the gear ratio increases. In other words, downshifting is performed. In addition, by increasing the amount of flow of the hydraulic fluid discharged at this time, the gear shifting speed increases.

The gear ratio is controlled such that the rotation speed of input shaft 502 of belt-type continuously variable transmission 500 (the rotation speed of primary pulley 504) becomes the target rotation speed set by using the map. The target rotation speed is set by using the map in which vehicle speed V and accelerator opening degree A (CC) are parameters.

In the present embodiment, when the garage shifting from the "N" position to the "D" position is done, ECU 900 sends the command signal to SLT linear solenoid valve 2200, thereby controlling the hydraulic pressure (C1 hydraulic pressure) supplied to forward clutch 406 and engaging forward clutch 406. At this time, the control (fast fill control) for sharply increasing the C1 hydraulic pressure temporarily at the initial stage is exercised to improve the control response of forward clutch 406, and then, the C1 hydraulic pressure is reduced again and the reduced C1 hydraulic pressure is gradually increased, thereby smoothly engaging forward clutch 406. As a result, a time period for which forward clutch 406 is engaged is shortened, and the engagement shock is also prevented.

When forward clutch 406 is engaged, driving power of engine 200 is transmitted to primary pulley 504 and primary pulley 504 starts to rotate. At this time, if the hydraulic cylinder of secondary pulley 508 is not sufficiently filled with the oil, shortage of the belt clamping force occurs, which leads to the belt slip. This belt slip occurs at the initial stage of startup of engine 200 in many cases.

In other words, when mechanical oil pump 310 starts to be driven with startup of engine 200, the hydraulic cylinder of secondary pulley 508 starts to be charged with the hydraulic pressure generated by oil pump 310, via modulator valve (1) 2310. When the garage shifting from the "N" position to the "D" position is done in the state where the hydraulic cylinder of secondary pulley 508 is not sufficiently filled with the oil, however, forward clutch 406 is engaged before the hydraulic cylinder of secondary pulley 508 is sufficiently charged with the oil, because the oil capacity of forward clutch 406 is smaller than the oil capacity of the hydraulic cylinder of secondary pulley 508. As a result, the driving power of engine 200 is transmitted to primary pulley 504 with the belt clamping force remaining insufficient, and thus, the belt slip occurs.

In order to prevent this belt slip, the waiting hydraulic pressure reduced to such an extent that forward clutch 406 is not engaged is temporarily supplied to forward clutch 406 even if the garage shifting is done, after startup of engine 200 and before the time when sufficient charging of the hydraulic cylinder of secondary pulley 508 with the oil is supposed to finish (hereinafter, control for temporarily supplying the waiting hydraulic pressure will also be referred to as waiting hydraulic pressure control). After the time when sufficient charging of the hydraulic cylinder of secondary pulley 508 with the oil is supposed to finish, the waiting hydraulic pressure control ends and the fast fill control starts.

If the fast fill control similar to the normal fast fill control (exercised when the waiting hydraulic pressure control is not exercised) is exercised after the waiting hydraulic pressure control is exercised, however, forward clutch 406 is engaged abruptly during the fast fill control and a shock may occur because the control response of forward clutch 406 has already been improved to some extent due to the waiting hydraulic pressure. This shock may also occur when the garage shifting from the "N" position to the "R" position is done.

In order to solve this problem, in the control apparatus according to the present embodiment, a control manner of the fast fill control is changed in accordance with the control response of forward clutch 406 at the end of the waiting hydraulic pressure control, in the fast fill control after the waiting hydraulic pressure control is exercised, thereby suppressing abrupt engagement of forward clutch 406 or reverse brake 410 during the fast fill control.

Figure 6:
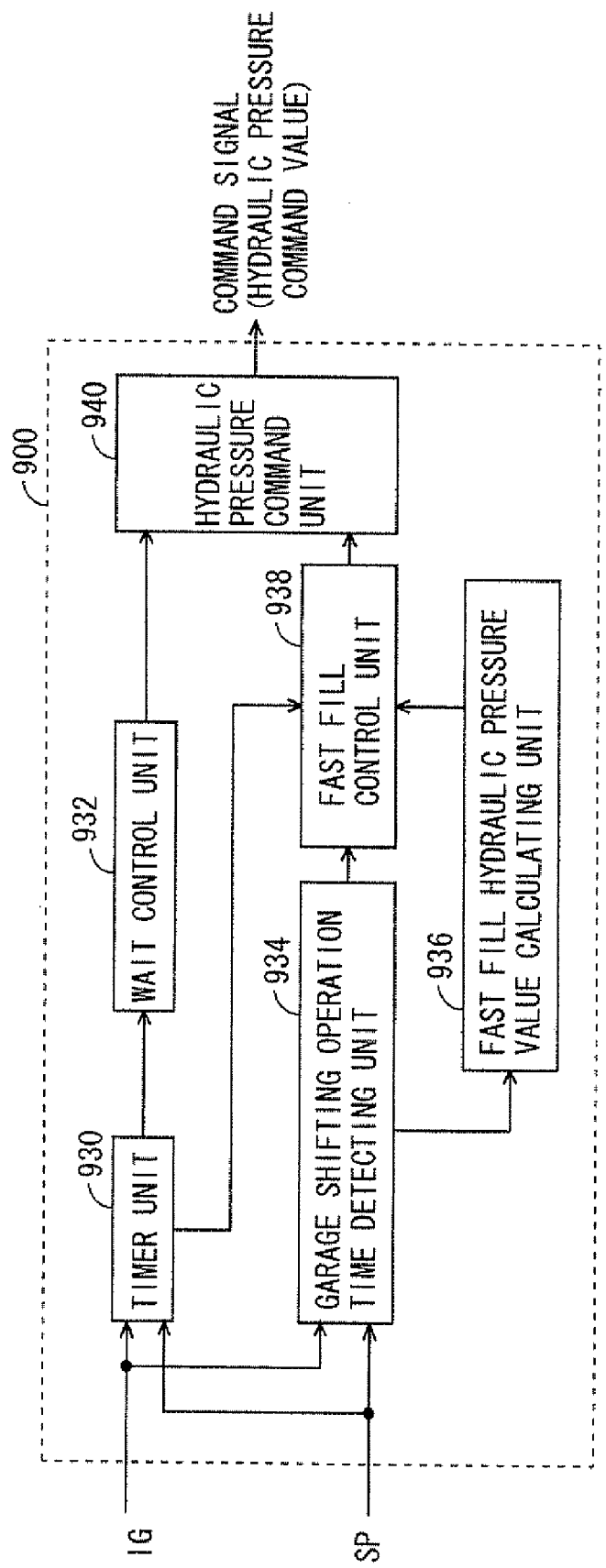
FIG. 6 is a functional block diagram of the control apparatus according to the first embodiment of the present invention.

A functional block diagram of the control apparatus according to the present embodiment will be described with reference to FIG. 6. As shown in FIG. 6, this control apparatus includes a timer unit 930, a wait control unit 932, a garage shifting operation time detecting unit 934, a fast fill hydraulic pressure value calculating unit 936, a fast fill control unit 938, and a hydraulic pressure command unit 940.

Timer unit 930 detects a time period that has elapsed since the engine started up, based on an ignition signal IG, and in addition, determines whether or not the detected time period exceeds a predetermined time period and sends a signal indicating the result of determination to wait control unit 932 and fast fill control unit 938. It is noted that the predetermined time period is a time period from when engine 200 starts up to when the hydraulic cylinder of secondary pulley 508 is sufficiently charged with the oil.

Wait control unit 932 exercises the waiting hydraulic pressure control over forward clutch 406 or reverse brake 410 based on the signal from timer unit 930 and position P (SH) of shift lever 920. Specifically, when the garage shifting is done before the time period that has elapsed since the engine started up exceeds the predetermined time period, the waiting hydraulic pressure reduced to such an extent that forward clutch 406 or reverse brake 410 is not engaged is sent to hydraulic pressure command unit 940 as a command hydraulic pressure value (a C1 command hydraulic pressure value or a B1 command hydraulic pressure value) for forward clutch 406 or reverse brake 410 before the fast fill control is exercised.

Garage shifting operation time detecting unit 934 detects a time period A from the engine startup to the garage shifting operation, based on ignition signal IG and position P (SH) of shift lever 920, and sends a signal indicating the result of detection to fast fill hydraulic pressure value calculating unit 936 and fast fill control unit 938.

Fast fill hydraulic pressure value calculating unit 936 calculates the C1 command hydraulic pressure value or the B1 command hydraulic pressure value at the time of the fast fill control that is based on time period A from the engine startup to the garage shifting operation, and sends a signal indicating the result of calculation to fast fill control unit 938.

Fast fill control unit 938 sets the final C1 command hydraulic pressure value or the final B1 command hydraulic pressure value at the time of the fast fill control, based on the signal from timer unit 930, the signal from garage shifting operation time detecting unit 934, and the signal from fast fill hydraulic pressure value calculating unit 936, and sends the final C1 command hydraulic pressure value or the final B1 command hydraulic pressure value to hydraulic pressure command unit 940.

Hydraulic pressure command unit 940 sends, to SLT linear solenoid valve 2200, a command signal from wait control unit 932 or fast fill control unit 938 corresponding to the C1 command hydraulic pressure value or the B1 command hydraulic pressure value.

The control apparatus according to the present embodiment having such functional blocks can be implemented in forms of both hardware and software, the hardware formed mainly of a digital circuit or an analog circuit and the software formed mainly of the CPU (Central Processing Unit) and the memory included in ECU 900, and a program read out from the memory and executed by the CPU. In general, implementation in the form of hardware is said to be advantageous in operation speed, and implementation in the form of software is said to be advantageous in design change. In the following, implementation of the control apparatus in the form of software will be described. It is noted that a recording medium having such a program recorded therein is also an aspect of the present invention.

Figure 7:
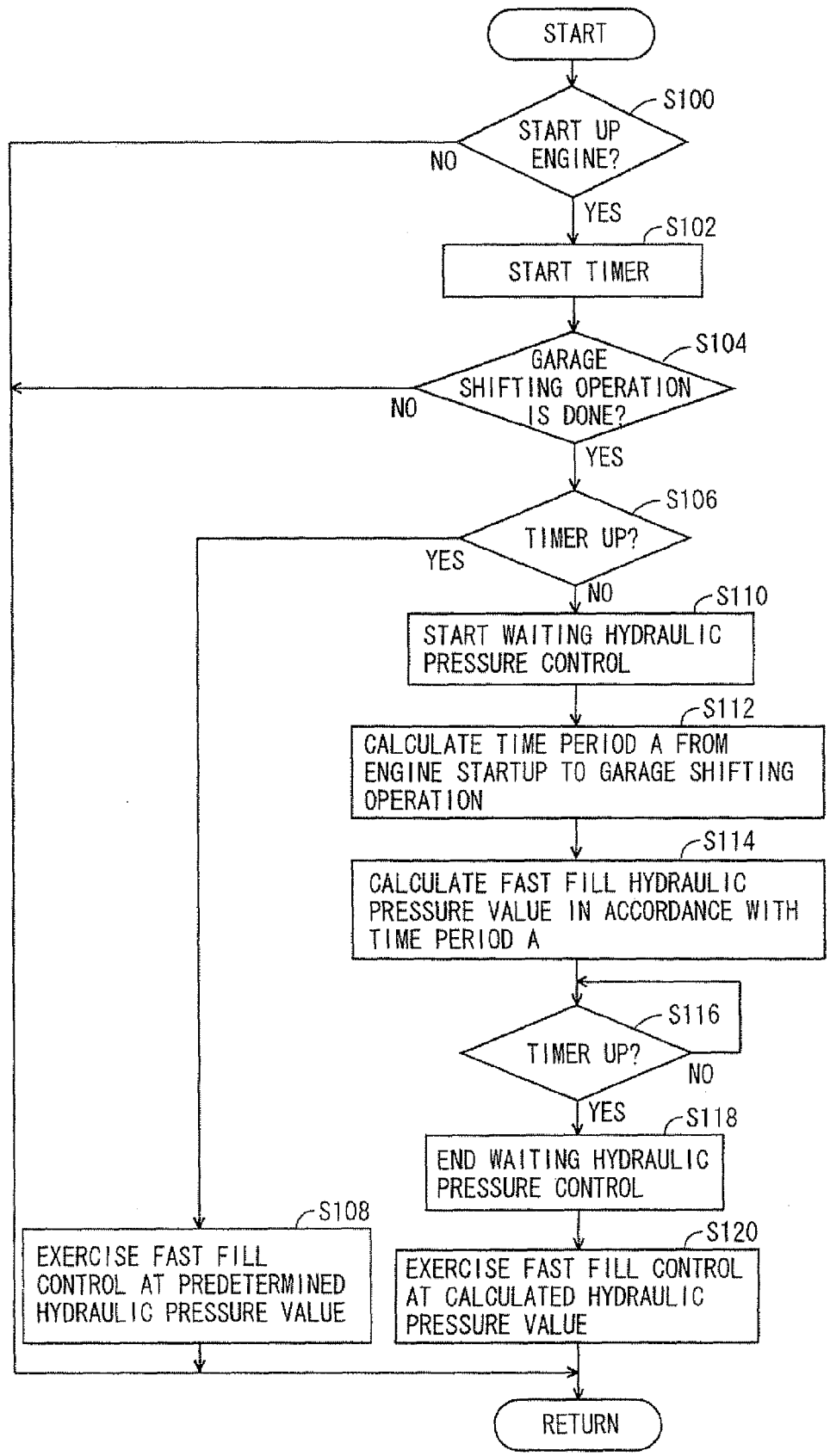
FIG. 7 is a flowchart illustrating a control structure of an ECU configuring the control apparatus according to the first embodiment of the present invention.

A control structure of a program executed by ECU 900 serving as the control apparatus according to the present embodiment will be described with reference to FIG. 7. It is noted that this program is repeatedly executed at a predetermined cycle time.

In step (hereinafter, the step will be abbreviated as "S") 100, ECU 900 determines whether or not engine 200 has started up. When the ignition signal is switched from OFF to ON, ECU 900 determines that engine 200 has started up. If engine 200 has started up (YES in S100), the process proceeds to S102. If not (NO in S100), this process ends.

In S102, ECU 900 starts a timer having the predetermined time period. As described above, the predetermined time period is a time period from when engine 200 starts up to when the hydraulic cylinder of secondary pulley 508 is sufficiently charged with the oil.

In S104, ECU 900 determines whether or not the garage shifting has been done. If the garage shifting has been done (YES in S104), the process proceeds to S106. If not (NO in S104), this process ends.

In S106, ECU 900 determines whether or not timer up has occurred. When the predetermined time period has elapsed since the engine started up, ECU 900 determines that the timer up has occurred. If the timer up has occurred (YES in S106), the process proceeds to S108. If not (NO in S106), the process proceeds to S110.

In S108, ECU 900 exercises the fast fill control at a predetermined hydraulic pressure value. This predetermined hydraulic pressure value is a fast fill hydraulic pressure value when the waiting hydraulic pressure control is not exercised (a target value of the hydraulic pressure supplied to forward clutch 406 or reverse brake 410 during the fast fill control). It is noted that the fast fill control is exercised only for a predetermined duration.

In S110, ECU 900 starts the waiting hydraulic pressure control. ECU 900 sends, to SLT linear solenoid valve 2200, the command signal for setting the waiting hydraulic pressure reduced to such an extent that forward clutch 406 or reverse brake 410 is not engaged as the C1 command hydraulic pressure value or the B1 command hydraulic pressure value.

In S112, ECU 900 detects time period A from the engine startup to the garage shifting operation.

Figure 8:
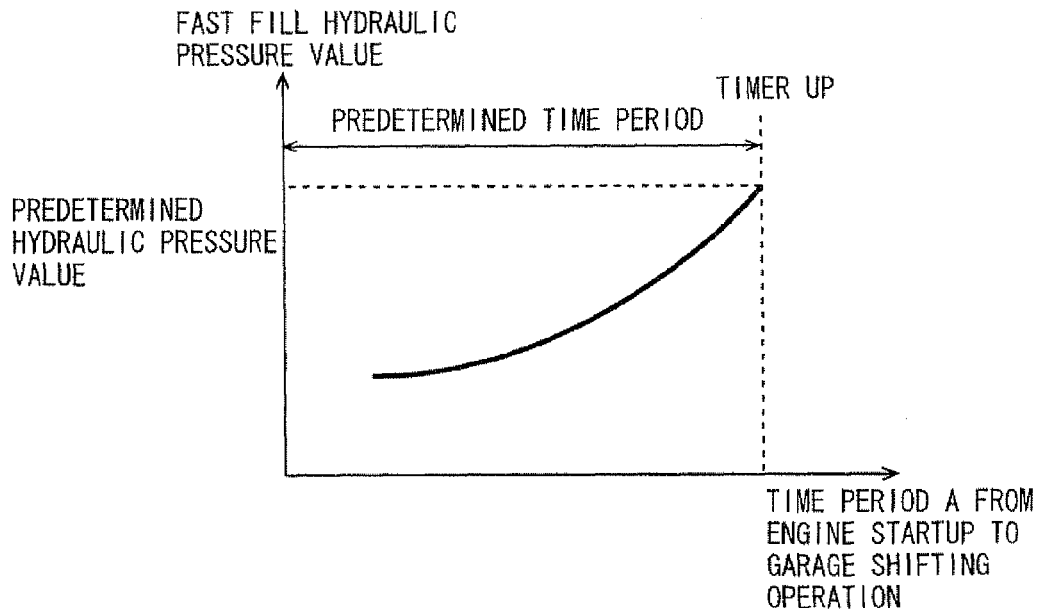
FIG. 8 illustrates the relationship between the amount of the fast fill hydraulic pressure and the time period from engine startup to the garage shifting operation.

In S114, ECU 900 calculates the fast fill hydraulic pressure value in accordance with detected time period A. For example, ECU 900 calculates the fast fill hydraulic pressure value based on the map in which time period A from the engine startup to the garage shifting operation is a parameter as shown in FIG. 8. In the map shown in FIG. 8, the fast fill hydraulic pressure value is set to the predetermined hydraulic pressure value (the hydraulic pressure value when the waiting hydraulic pressure control is not exercised) when time period A is the predetermined time period, and the fast fill hydraulic pressure value is set to become smaller as time period A becomes shorter. In other words, the fast fill hydraulic pressure value is set to become smaller as a duration of the waiting hydraulic pressure control from the garage shifting operation to the timer up becomes longer.

In S116, ECU 900 determines whether or not the timer up has occurred. If the timer up has occurred (YES in S116), the process proceeds to S118. If not (NO in S116), ECU 900 waits until the timer up occurs. In S118, ECU 900 ends the waiting hydraulic pressure control.

In S120, ECU 900 exercises the fast fill control at the calculated fast fill hydraulic pressure value. ECU 900 sends, to SLT linear solenoid valve 2200, the command signal for setting the calculated fast fill hydraulic pressure value as the C1 command hydraulic pressure value or the B1 command hydraulic pressure value. It is noted that the fast fill control is exercised only for the predetermined duration.

The C1 command hydraulic pressure value will be described, which is controlled by ECU 900 serving as the control apparatus according to the present embodiment based on the above structure and flowchart. It is noted that, in the following description, the C1 command hydraulic pressure value when the garage shifting from the "N" position to the "D" position is done will be described.

Figure 9:
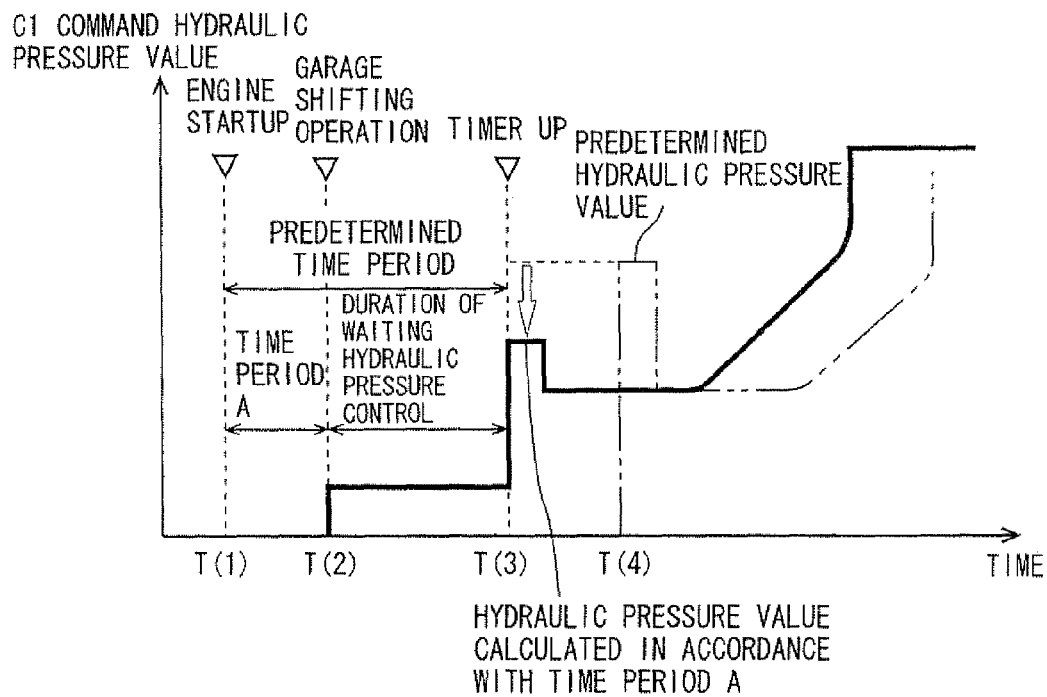
FIG. 9 is a timing chart of a C1 command hydraulic pressure value when the garage shifting is done.

As shown in FIG. 9, when engine 200 starts up at time T(1) (YES in S100), the timer having the predetermined time period starts (S102).

When the garage shifting is done at time T(4) after the predetermined time period has elapsed since the engine started up (YES in S104 and YES in S106), the C1 command hydraulic pressure value is set to the predetermined hydraulic pressure value and the fast fill control is exercised as shown by a chain double-dashed line in FIG. 9 (S108).

On the other hand, when the garage shifting is done at time T(2) before the predetermined time period has elapsed since the engine started up (YES in S104 and NO in S106), the C1 command hydraulic pressure value is set to the hydraulic pressure reduced to such an extent that forward clutch 406 is not engaged, and the waiting hydraulic pressure control starts (S110), in the case where the predetermined time period has not elapsed since the engine started up (NO in S106), that is, in the case where sufficient charging of the hydraulic cylinder of secondary pulley 508 is not supposed to finish. As a result, transmission of the driving power of engine 200 to primary pulley 504 with the belt clamping force remaining insufficient is suppressed, and thus, the belt slip is suppressed. Furthermore, time period A from the engine startup to the garage shifting operation is detected (S112), and the fast fill hydraulic pressure value is calculated in accordance with detected time period A (S114).

When the predetermined time period has elapsed since the engine started up and the timer up has occurred at time T(3) (YES in S116), the waiting hydraulic pressure control ends (S118), and the fast fill control is exercised at the calculated fast fill hydraulic pressure value (S120).

As shown in the map in FIG. 8, the fast fill hydraulic pressure value after the waiting hydraulic pressure control ends is set to be smaller than the predetermined hydraulic pressure value (the hydraulic pressure value when the waiting hydraulic pressure control is not exercised) and is set to become smaller as time period A from the engine startup to the garage shifting operation becomes shorter. In other words, as the duration of the waiting hydraulic pressure control from the garage shifting operation to the timer up becomes longer, the control response of forward clutch 406 is determined as being high and the fast fill hydraulic pressure value after the waiting hydraulic pressure control ends is made smaller. As a result, abrupt engagement of forward clutch 406 during the fast fill control after the waiting hydraulic pressure control is suppressed.

It is noted that, after the fast fill control, the C1 command hydraulic pressure value is reduced again and the reduced C1 command hydraulic pressure value is gradually increased. As a result, the time period for which forward clutch 406 is engaged can be shortened and the engagement shock can also be prevented.

As described above, according to the control apparatus of the present embodiment, in the fast fill control after the waiting hydraulic pressure control, as time period A from the engine startup to the garage shifting operation becomes shorter (that is, as the duration of the waiting hydraulic pressure control from the garage shifting operation becomes longer), the control response of forward clutch 406 or reverse brake 410 is determined as having been improved and the fast fill hydraulic pressure value after the waiting hydraulic pressure control ends is made smaller. As a result, abrupt engagement of forward clutch 406 or reverse brake 410 during the fast fill control after the waiting hydraulic pressure control is suppressed.

Although the case has been described in the present embodiment, in which the fast fill hydraulic pressure value after the waiting hydraulic pressure control ends is changed in accordance with the control response of forward clutch 406 or reverse brake 410 at the end of the waiting hydraulic pressure control, the duration of the fast fill control after the waiting hydraulic pressure control ends may be changed instead of the fast fill hydraulic pressure value or in addition to the fast fill hydraulic pressure value. For example, as time period A from the engine startup to the garage shifting operation becomes shorter, the duration of the fast fill control is shortened. This also leads to suppression of abrupt engagement of forward clutch 406 or reverse brake 410 during the fast fill control after the waiting hydraulic pressure control.

Furthermore, although the control response of forward clutch 406 or reverse brake 410 is determined based on the duration of the waiting hydraulic pressure control in the present embodiment, the control response of forward clutch 406 or reverse brake 410 may be determined in accordance with, for example, a stop duration before the engine startup that is correlated with the amount of oil remaining in the hydraulic cylinder of secondary pulley 508, the oil temperature correlated with the viscosity of the oil, and the like, instead of the duration of the waiting hydraulic pressure control or in addition to the duration of the waiting hydraulic pressure control.

It should be understood that the embodiments disclosed herein are illustrative and not limitative in any respect. The scope of the present invention is defined by the terms of the claims, rather than the above description, and is intended to include any modifications within the scope and meaning equivalent to the terms of the claims.

The invention claimed is:

1. A control apparatus for a continuously variable transmission including a hydraulic clutch by which driving power between a power source and a driving wheel is switched to either a transmission state or a non-transmission state based on an occupant's operation, the control apparatus comprising:

a reducing unit for temporarily reducing a hydraulic pressure supplied to said clutch such that said clutch waits in said non-transmission state, when an occupant performs an operation of switching said clutch from said non-transmission state to said transmission state before a predetermined time period has elapsed since said power source started up; and a control unit for, when the hydraulic pressure supplied to said clutch is increased after temporary reduction by said reducing unit, controlling at least any one of an amount of increase in the hydraulic pressure supplied to said clutch and a time period for which the hydraulic pressure supplied to said clutch is increased, based on a state related to a control response of said clutch at an end of said temporary reduction, said control unit determining that the control response of said clutch is high and decreasing at least any one of the amount of increase in the hydraulic pressure supplied to said clutch and the time period for which the hydraulic pressure supplied to said clutch is increased, more greatly when a duration of said temporary reduction is long than when the duration of said temporary reduction is short.

2. The control apparatus according to claim 1, wherein said continuously variable transmission is a belt-type continuously variable transmission.

3. A control method executed by a control apparatus for a continuously variable transmission including a hydraulic clutch by which driving power between a power source and a driving wheel is switched to either a transmission state or a non-transmission state based on an occupant's operation, the control method comprising the steps of temporarily reducing a hydraulic pressure supplied to said clutch such that said clutch waits in said non-transmission state, when an occupant performs an operation of switching said clutch from said non-transmission state to said transmission state before a predetermined time period has elapsed since said power source started up; and when the hydraulic pressure supplied to said clutch is increased after temporary reduction by said step of temporarily reducing a hydraulic pressure supplied to said clutch, controlling at least any one of an amount of increase in the hydraulic pressure supplied to said clutch and a time period for which the hydraulic pressure supplied to said clutch is increased, based on a state related to a control response of said clutch at an end of said temporary reduction, said step of controlling at least any one of an amount of increase in the hydraulic pressure supplied to said clutch and a time period for which the hydraulic pressure supplied to said clutch is increased including the step of determining that the control response of said clutch is high and decreasing at least any one of the amount of increase in the hydraulic pressure supplied to said clutch and the time period for which the hydraulic pressure supplied to said clutch is increased, more greatly when a duration of said temporary reduction is long than when the duration of said temporary reduction is short.

4. The control method according to claim 3, wherein said continuously variable transmission is a belt-type continuously variable transmission.

* * * * *